US011434630B1

(12) United States Patent
Shah

(10) Patent No.: US 11,434,630 B1
(45) Date of Patent: Sep. 6, 2022

(54) HAIR STRAINING DEVICE

(71) Applicant: Meet Ochhavlal Shah, Laurel, MD (US)

(72) Inventor: Meet Ochhavlal Shah, Laurel, MD (US)

(73) Assignee: MS Digital Consult LLC, Laurel, MD (US)

( * ) Notice: Subject to any disclaimer, the term of this patent is extended or adjusted under 35 U.S.C. 154(b) by 0 days.

(21) Appl. No.: 17/721,934

(22) Filed: Apr. 15, 2022

Related U.S. Application Data

(60) Provisional application No. 63/270,602, filed on Oct. 22, 2021, provisional application No. 63/314,063, filed on Feb. 25, 2022.

(51) Int. Cl.
*E03C 1/264* (2006.01)
*B01D 35/28* (2006.01)
*E03F 5/04* (2006.01)
*E03F 5/06* (2006.01)

(52) U.S. Cl.
CPC .............. *E03C 1/264* (2013.01); *B01D 35/28* (2013.01); *E03F 5/0408* (2013.01); *E03F 5/06* (2013.01)

(58) Field of Classification Search
CPC .......... E03C 1/26; E03C 1/264; E03F 5/0408; E03F 5/06; E04D 13/0409; E04D 2013/0413
USPC ............................. 210/163; 4/679, 286, 292
See application file for complete search history.

(56) References Cited

U.S. PATENT DOCUMENTS

| | | | | |
|---|---|---|---|---|
| 286,951 A * | 10/1883 | McBee | ................... | B01D 29/05 210/163 |
| 1,903,366 A * | 4/1933 | Mercier | ................... | E03C 1/264 4/292 |
| 3,517,813 A * | 6/1970 | Kunibert | ............. | E04D 13/0409 210/166 |
| 5,526,613 A * | 6/1996 | Simeone, Jr. | ....... | E04D 13/0409 210/163 |
| 6,263,518 B1* | 7/2001 | Magtanong | ............... | E03C 1/26 4/292 |
| 7,300,573 B1* | 11/2007 | Trangsrud | ................. | E03F 1/00 210/163 |
| 7,875,178 B2* | 1/2011 | Ashliman | ............. | E03F 5/0404 210/163 |
| 8,011,030 B2* | 9/2011 | Li | ........................... | E03C 1/262 4/286 |
| 10,982,425 B1* | 4/2021 | Grumbach | ............ | E03F 5/0408 |
| 2010/0025312 A1* | 2/2010 | Martin | .................... | E02B 5/085 210/163 |
| 2019/0218758 A1* | 7/2019 | Karnegie | ................. | E03C 1/264 |
| 2021/0277640 A1* | 9/2021 | Gwen | ..................... | E03C 1/264 |

* cited by examiner

*Primary Examiner* — Christopher Upton
(74) *Attorney, Agent, or Firm* — Barry Choobin; Patent 360

(57) ABSTRACT

A straining device for bathtub drains to capture fallen hairs from water flowing into the drain. The straining device includes a tubular body that has multiple apertures in its wall and an open bottom. The body is divided into two parts that are pivotally coupled at the base through two opposite hinge joints. The tops of the two parts can be pivoted away from each other. To remove the trapped hairs, the tops of the two parts can be pulled away from each other resulting in dropping off the trapped hair on the outer surface of the straining device.

20 Claims, 18 Drawing Sheets

HAIR STRAINING DEVICE

CROSS-REFERENCE TO RELATED APPLICATIONS

This application claims priority from the U.S. Prov. Pat. App. Ser. No. 63/270,602 filed on Oct. 22, 2021, this application also claims priority from the U.S. Prov. Pat. App. Ser. No. 63/314,063 filed on Feb. 25, 2022, both of the above applications are incorporated herein by reference in its entirety.

FIELD OF THE INVENTION

The present invention relates to a hair straining device, and more particularly, the present invention relates to a straining device for use in a drain to collect hairs.

BACKGROUND

A Straining device is used at a drain opening to collect any debris in the water and thus preventing the debris to get deposited in the drains and leading to blockage of the drain. Straining devices are used in bathtubs to collect fallen hairs that may otherwise drain with water and get deposited in the drain, leading to clogged drains. The hairs act as a web that captures other debris leading to the clogged drains. To unclog the clogged drains, typically harsh chemicals, and professional help are needed. The harsh chemicals can be harmful to the environment and professional help comes at a cost. The use of straining devices at the opening of the drains is thus extremely helpful in collecting the debris and preventing the debris from getting into the drains. Assorted designs of the straining devices are known in the art to enhance or improve the straining effect. However, one major drawback with the known straining devices is the removal of the debris from the straining device which can be unhygienic and gruesome. Removing the hairs from the straining device of a bathtub may require a user to physically untangle the hair wrapped around the strainer with a hand, which is tedious and unhygienic. Usually, long hairs get wrapped around a filter, and it takes a lot of effort to pull out the tangled hairs which is very unappealing to many. Moreover, the collected hair in the straining device impedes the flow of water into the drain.

A need is therefore appreciated for a novel straining device that is devoid of the aforesaid drawbacks of the known straining devices for a drain but includes all the advantages.

BRIEF SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a straining device for a bathtub drain, shower stall, and sink strainer that allows the removal of debris including hairs without the need to pick the debris/hairs by hands.

It is another object of the present invention that the flow through the straining device can be maintained while hairs get deposited onto the straining device.

It is still another object of the present invention that the straining device can be easily and hygienically cleaned.

In one aspect, disclosed is a straining device for bathtub drains, shower stall, and sink strainer that can trap hairs in the wastewater while allowing the water to freely flow into the drain. The disclosed straining device can be cleaned off the collected hairs without requiring the user to touch the unpleasant hairs tangled around the straining device. The straining device includes a body having a top and a wall extending downwards from the top, and an encircling base along the bottom periphery of the wall, wherein the base defines an open bottom of the body, wherein the top and the wall define an inner volume of the body. The body can be divided into two parts i.e., a left part and a right part by an imaginary vertical plane, perpendicular to the top, and passing through the top and the wall of the body. A top of the left part and a top of the right part form the top of the body. A wall of the left part and a wall of the right part form the wall of the body.

In one aspect, the base of the body can be continuous and made of a flexible material that allows the left part and right part to pivot relative to each other. Alternatively, the left part and the right part can be pivotally coupled to each other at their bottoms through hinge joints.

In one aspect, a top of the left part and a top of the right part are releasably coupled to each other using an interlocking fastener.

In one aspect, disclosed is a straining device comprising a body, the body has a horizontal top and a tubular wall extending downwards from the horizontal top, the tubular wall has a plurality of apertures for water to pass through, a bottom of the body is open; a flat base around a bottom periphery of the tubular wall, wherein the body comprises a left part and a right part, the left part has a left top portion and a left wall, the right part has a right top portion and a right wall, wherein the left wall and the right wall form the tubular wall, wherein the left top portion and the right top portion form the horizontal top, wherein the left part and the right part are pivotally coupled to each other at the flat base. The left part is a mirror image of the right part. The tubular wall has an upper portion and a lower portion, the upper portion is continuous with the lower portion, the upper portion is of a hollow cylindrical shape, the lower portion is of a conical frustum shape, wherein a diameter of a bottom of the lower portion is larger than a diameter of a top of the lower portion. The apertures in the upper portion are different from apertures in the lower portion. The apertures in the upper portion are of a rectangular shape and the apertures in the lower portion are elongated and vertically oriented. The flat base comprises two hinge joints for pivotally coupling the left part and the right part.

In one implementation, the straining device further comprises a left tab that upstands from the left top portion, the left tab configured to be grabbed between two fingers or a finger and a thumb of a left hand; and a right tab that upstands from the right top portion, the right tab configured to be grabbed between two fingers or a finger and a thumb of a right hand. The straining device further comprises an interlocking fastener configured to releasably couple the left top portion and the right top portion. The interlocking fastener comprises a male mating member and a female mating member, the left tab configured with the male mating member, and the right tab is configured with the female mating member wherein the male mating member is configured to be releasably fasten to the female mating member.

In one implementation, the flat base is continuous along the left part and the right part, the body and the flat base are made of a semi-rigid material, wherein two bottom corners of each of the left part and the right part have arc shape cutouts.

In one aspect, disclosed is a method for straining fallen hairs from water flowing into a drain, the method comprising the steps of providing a straining device comprising a body, the body has a horizontal top and a tubular wall extending downwards from the horizontal top, the tubular wall has a plurality of apertures for water to pass through, a bottom of the body is open; and a flat base around a bottom periphery of the tubular wall, wherein the body comprises a left part and a right part, the left part has a left top portion and a left wall, the right part has a right top portion and a right wall, wherein the left wall and the right wall form the tubular wall, wherein the left top portion and the right top portion form the horizontal top, wherein the left part and the right part are pivotally coupled to each other at the flat base.

BRIEF DESCRIPTION OF THE DRAWINGS

Some embodiments of the present invention as an example and are not limited by the figures of the accompanying drawings, in which like references may indicate similar elements and in which.

DETAILED DESCRIPTION OF THE INVENTION

Figure 1:
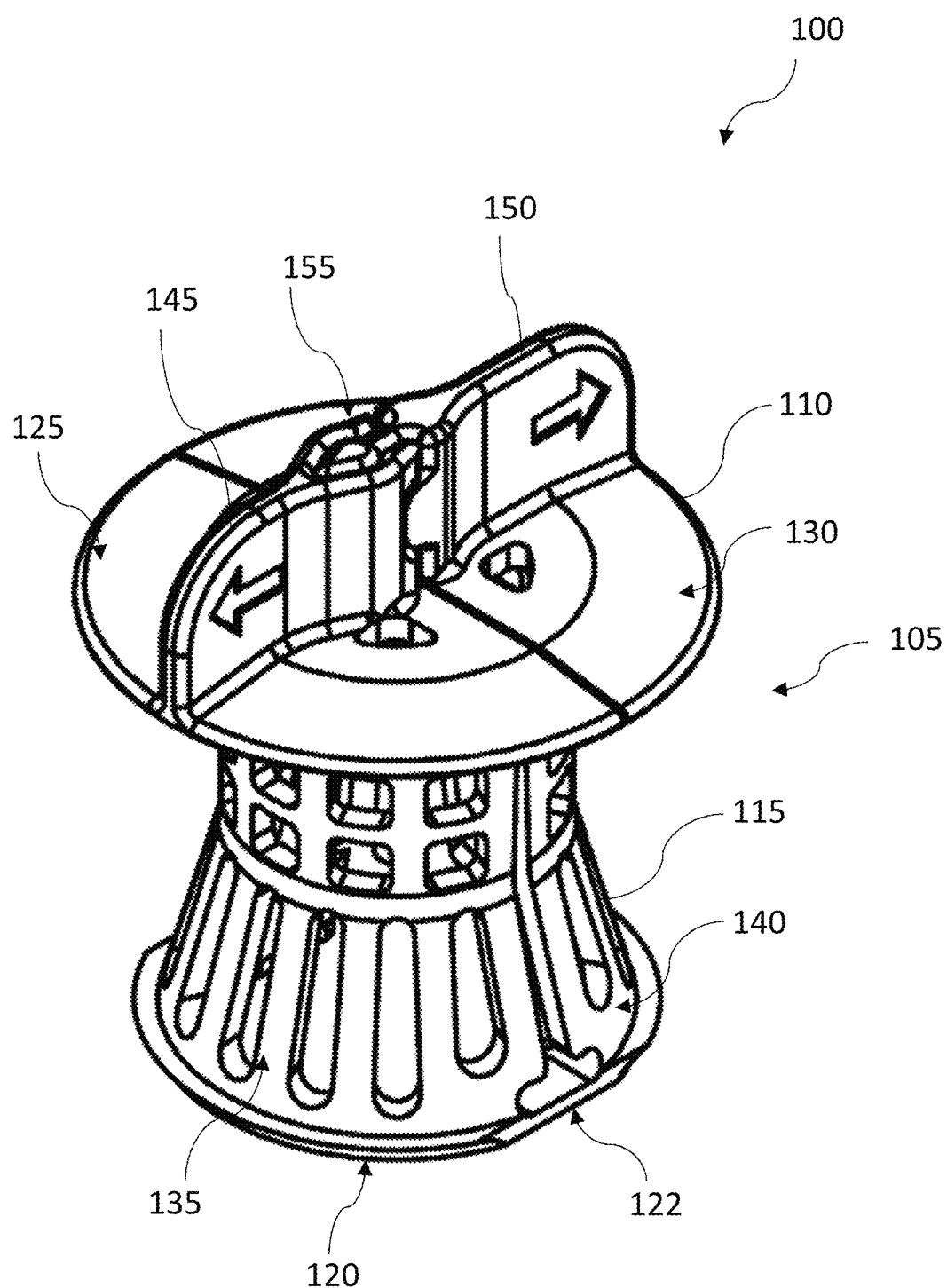
FIG. 1 illustrates a front and top perspective view of a straining device, according to an exemplary embodiment of the present invention.

The terminology used herein is to describe particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Disclosed is a straining device for use in drains to capture fallen hairs that otherwise would flow into the drain with water and can clog the drain. The disclosed straining device can be used in a bathtub to capture any fallen hairs from the water, while the water and any other debris can freely flow into the drain. In particular, the disclosed straining device may not require a user to contact/touch unpleasant collected molded hair in the strainer when removing.

Referring to FIGS. 1-11 which illustrates an exemplary embodiment of the disclosed straining device 100 for preventing fallen hairs in a bathtub or a bathroom from reaching the drains. The straining device 100 can include a body 105 that can include a top 110 and a wall 115, wherein the top and the wall define an inner volume of the body 105. The body 105 is shown substantially cylindrical, however, any other shape of the body is within the scope of the present invention, for example, a square shape. Perhaps the shape of the body may depend upon the shape of the drain hole of the bathtub, which is round by current standards. Thus, preferably, the body can be substantially cylindrical. Wall 115 of the body 105 extends downwards substantially perpendicular to the horizontal top 110, and then slopes outward substantially at a mid-height of the wall, to form a frustum conical shape skirt. Thus, a circumferential diameter of the bottom is much larger than a circumferential diameter of the top. Based on the slope, the wall can have an upper portion and a lower portion. The lower portion is sloped outwards, similar to an upside-down frustum cone while the upper portion can be straight similar to a hollow cylinder. Such a shape of the body may be critical for proper water flow. A normal bathtub drain hole has a threaded nut in the center of the drain hole connected by four bridges. This central threaded nut can create a bottleneck in the water flow if the body is cylindrical throughout. Another important reason for such a shape of the body can be to aid in the release of collected hair, as described later.

Each of the upper portion and the lower portion of the wall 115 can have apertures for the water to pass through into the drain. In one implementation, the apertures in the upper portion and the lower portion can be the same. In one implementation, the apertures in the upper portion and the bottom portion can be different. For example, the drawings show the upper portion has rectangular apertures 170 (FIG. 5) while the lower portion has elongated vertical apertures 175. The top 110 can be wide and horizontal which can hide the drain hole and may also prevent any fallen object to get into the drain.

Figure 2:
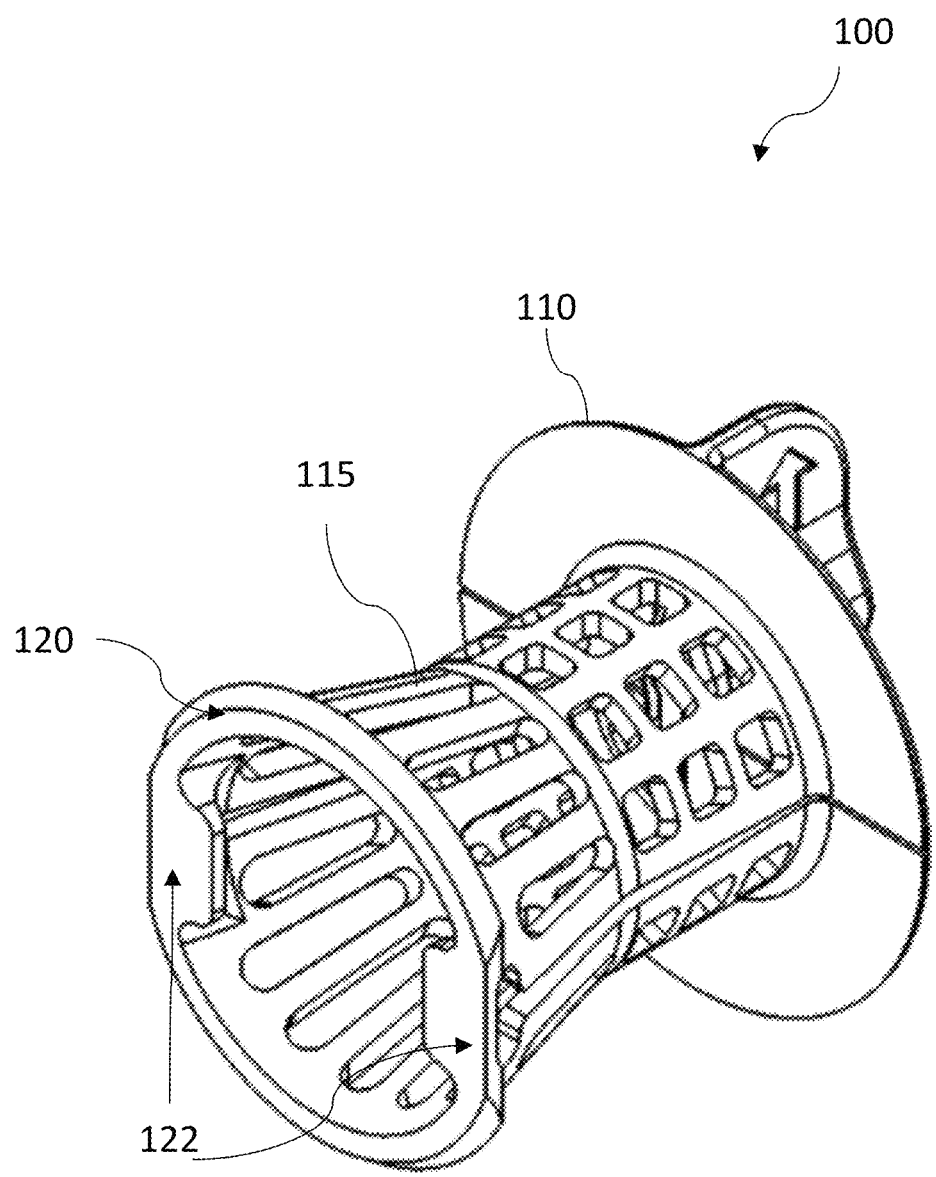
FIG. 2 is a bottom and side perspective view of the straining device, according to an exemplary embodiment of the present invention.
Figure 3:
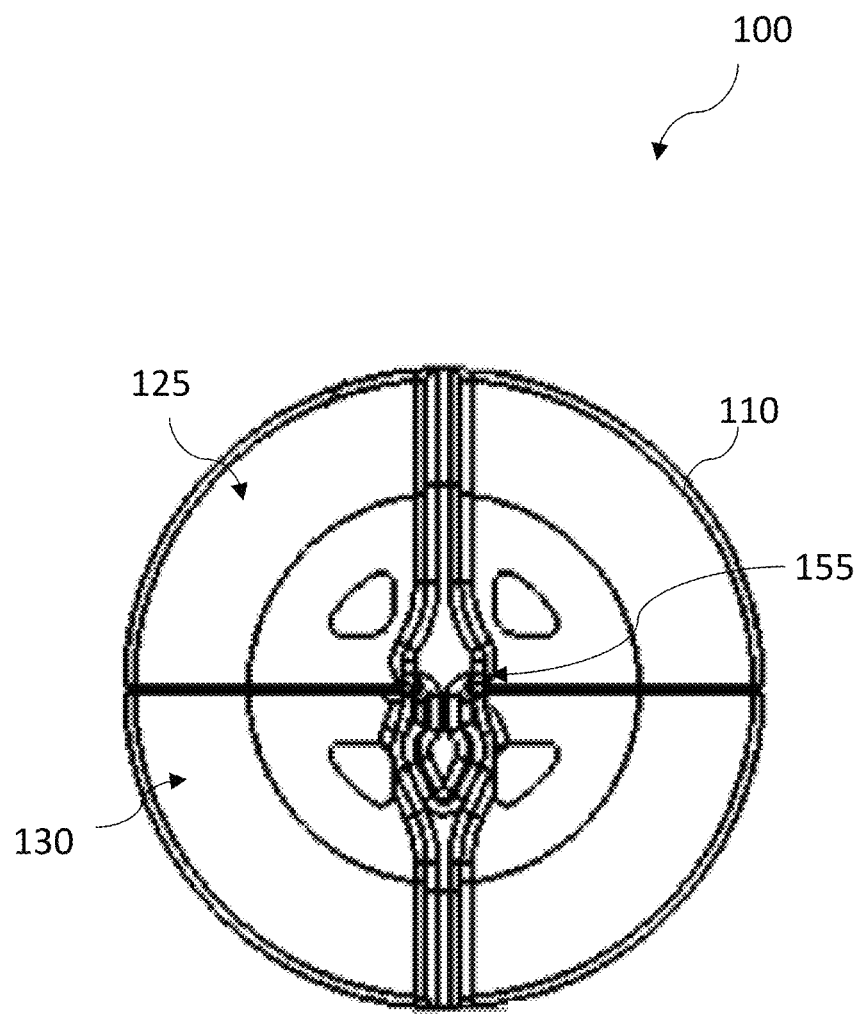
FIG. 3 is a top view of the straining device, according to an exemplary embodiment of the present invention.

Referring to FIG. 2, which shows a bottom and side perspective view of the straining device 100. The bottom periphery of the wall can form a base of the body, the bottom of the body can be hollow having an encircling round and continuous base. The base can be flat such that the straining device can be placed on an encircling flange of a drain. The base can be made of a soft material that can provide a certain amount of seal against the surface over which the straining device 100 is placed. The base can be made of the same material as that of the walls of the body. Alternatively, the base can have a layer of material different from that of the wall of the body. The base and the wall can be integral to form a single unit. The base can be rounded to form a lip, the drawing shows the base has two rounded lips separated by two thick portions that lie opposite each other. The two thick portions 122 can be hinge joints in certain implementations. Alternatively, the two lips and the two thick portions can be integral to form a single unit.

Figure 4:
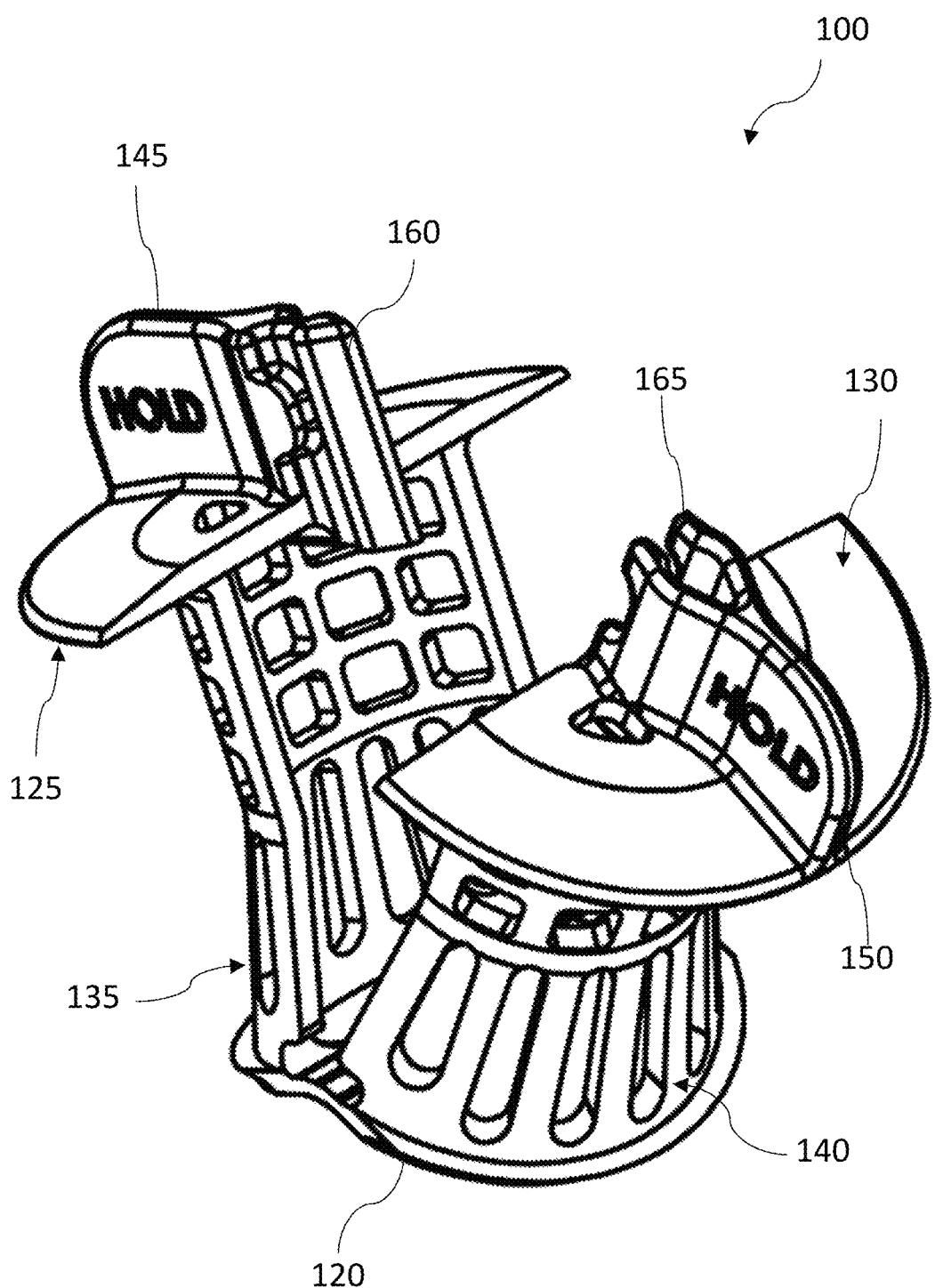
FIG. 4 shows the straining device in a partially open state, according to an exemplary embodiment of the present invention.
Figure 5:
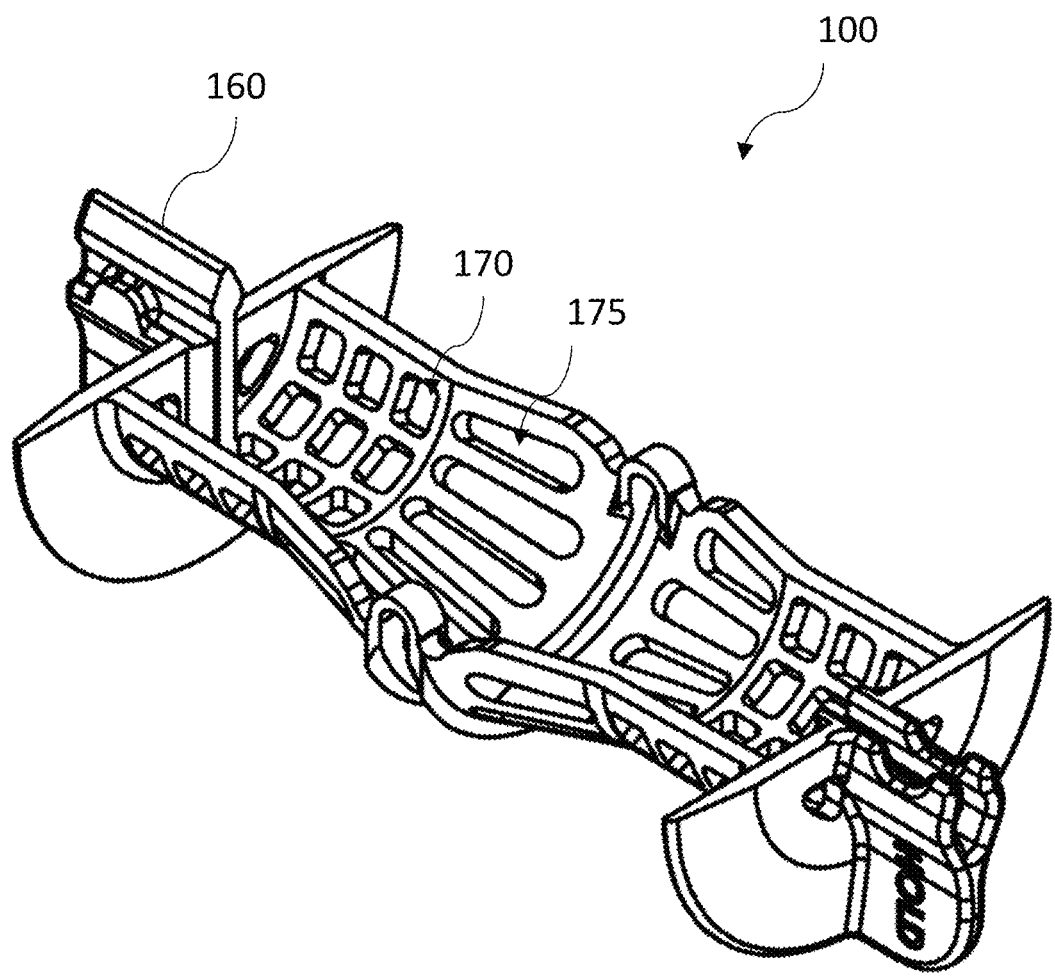
FIG. 5 shows the straining device open at 180 degrees, according to an exemplary embodiment of the present invention.
Figure 6:
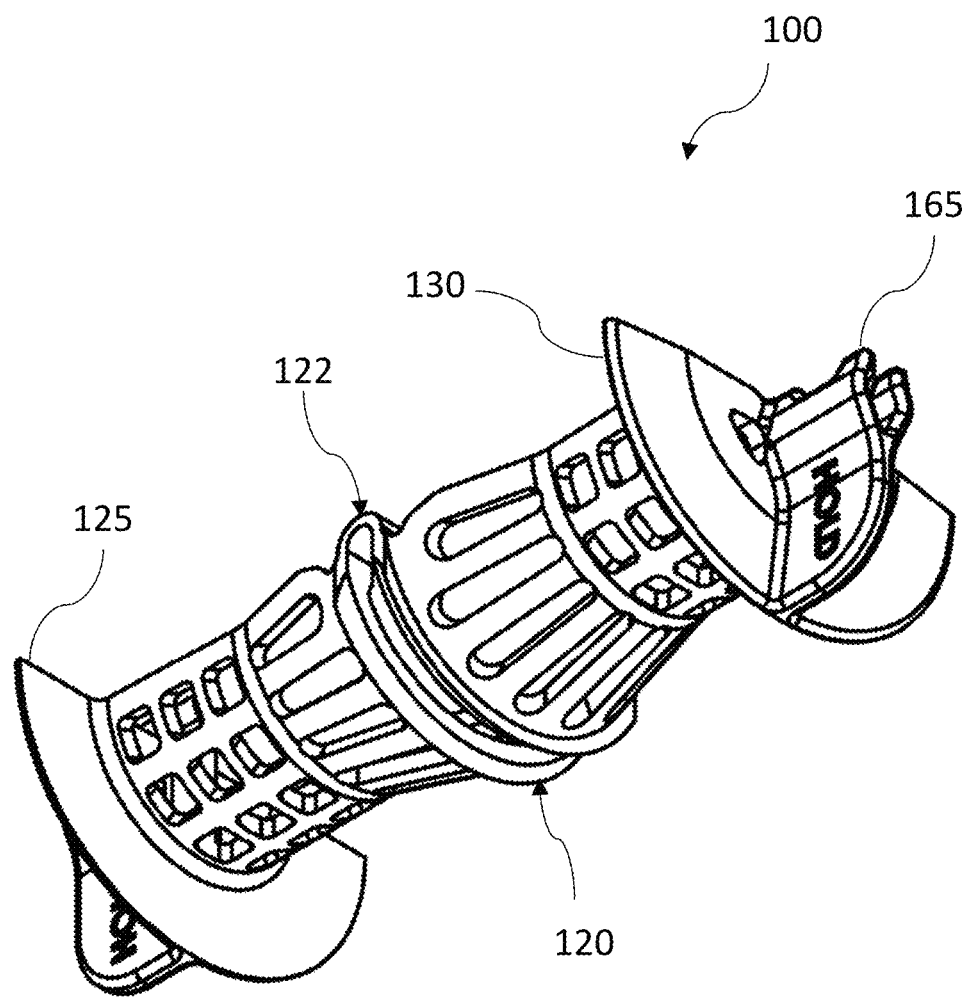
FIG. 6 is a bottom and side perspective view of the straining device as shown in FIG. 5, according to an exemplary embodiment of the present invention.
Figure 7:
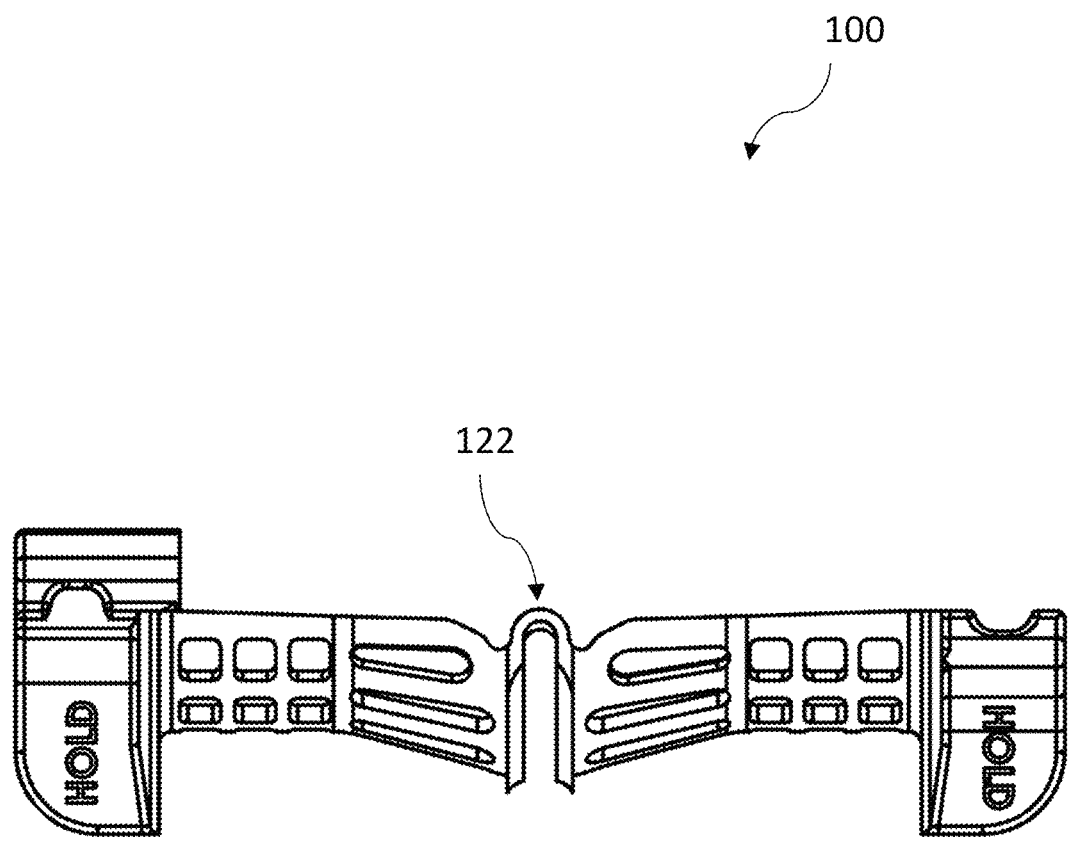
FIG. 7 is a side view of the straining device as shown in FIG. 5, according to an exemplary embodiment of the present invention.
Figure 8:
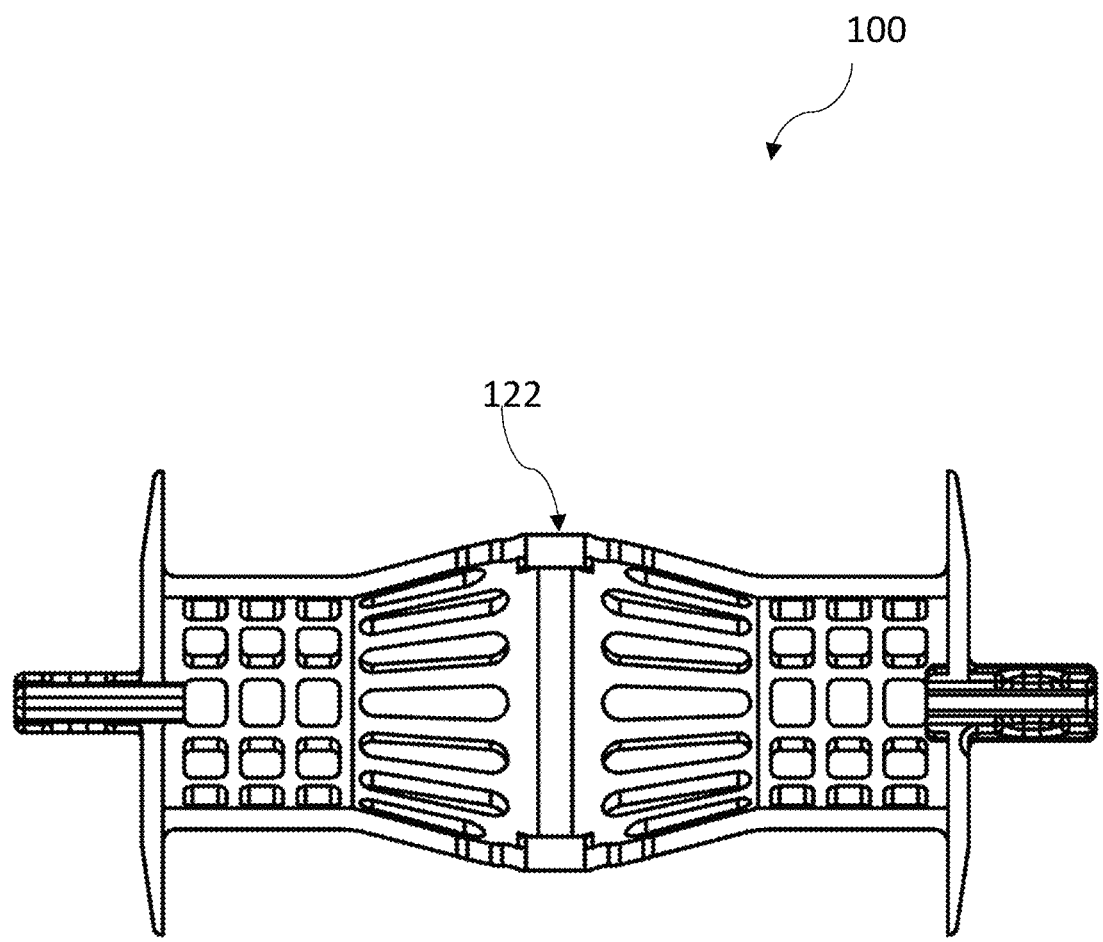
FIG. 8 is a top view of the straining device as shown in FIG. 5, according to an exemplary embodiment of the present invention.
Figure 9:
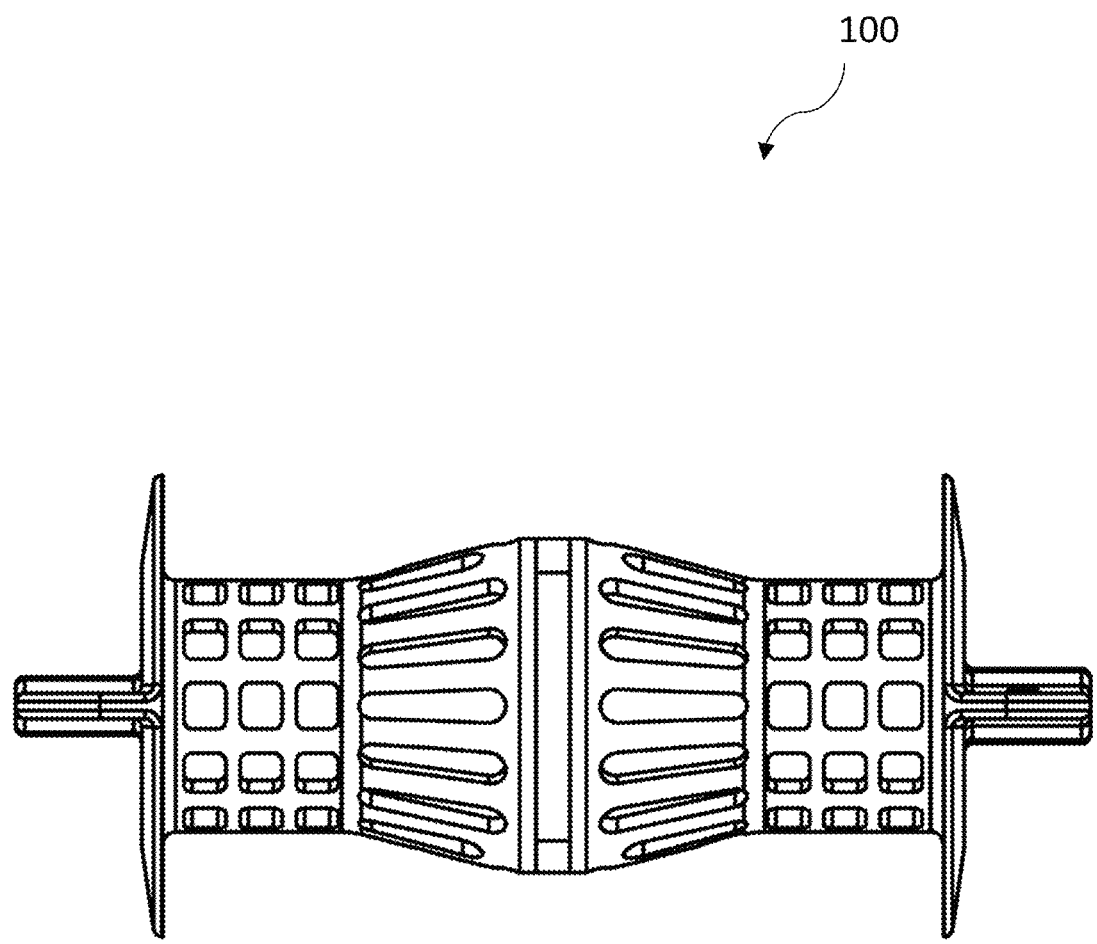
FIG. 9 is a bottom view of the straining device as shown in FIG. 5, according to an exemplary embodiment of the present invention.

The body can be divided into two parts by a vertical plane that passes through the top 110 and wall 115 of the body 105. As shown in the drawings, body 105 can be divided into two parts while the base can be intact and continuous, and the two parts can remain connected at the base. While the drawings show the two parts i.e., a left part and a right part of the same size, however, one part can be larger than the other and any variations in the size of the two parts of the body are within the scope of the present invention. The left part and the right part can pivot at the base, and in particular, at the two thick portions 122 of the base 120, such that the two parts can move away from each other. FIG. 4 shows the two parts being pivoted away from each other and FIG. 5 shows the body 105 opened at 180 degrees while the two thick portions 122 of the base 120 are flexed to form a u-shape. In addition, these flexible hinges 122 create a conformation such that collected hairs automatically fall off from the disclosed device, as described later. Since the base is flexible, the two parts can be pivoted away from each other at angles more than 180 degrees. The portion of the base i.e., the thickened portions, that hinges due to the pivoting of the two parts of the body 105 can be thickened to provide durability against bending and prolonging the life of the disclosed device 100. While the drawings show the base as a single unit and continuous, however, the two parts along with the respective bases can be separated and the bases of two parts can be coupled through a hinge joint, and any such modification is within the scope of the present invention. Also, the invention has been described as separating the body into two parts, however, the two parts can be manufactured separated and coupled at the base through the hinge joints. Alternatively, the body can be manufactured in two parts with a common base, as shown in FIG. 5. Thus, the dividing of the body into two parts is for explanation only, and the body can be manufactured as shown in FIG. 5.

The left part of the body 105 can have a left top 125 and the right part of the body 105 can have the right top 130. The left top 125 and the right top 130 can form the top 110 of the body 105. Similarly, the left part of the body 105 can have a left wall 135 and the right part of the body 105 can have the right wall 140. The left wall 135 and the right wall 140 can form the wall 115 of the body 105. A left tab 145 upstands from the left top 125 and a right tab 150 extends upwards from the right top 130. The two tabs i.e., 145 and 150 can be configured to be grabbed by two hands for pivoting the left part and the right part. For example, the tab can be grasped between a finger and a thumb of a hand. While being grabbed, the tabs can be pulled outward and away from each other to open the body. Similarly, the tabs can be moved towards each other by the force from both hands to close the disclosed device.

Figure 10:
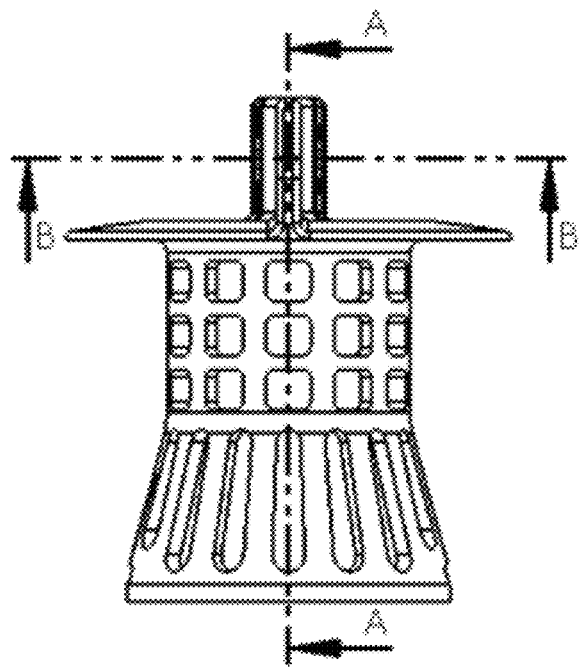
FIG. 10 is a front view of the straining device, according to an exemplary embodiment of the present invention.
Figure 10B:
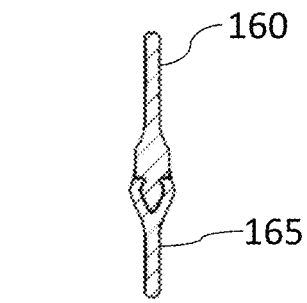
FIG. 10B is a sectional view of FIG. 10 taken along line B-B, according to an exemplary embodiment of the present invention.
Figure 10A:
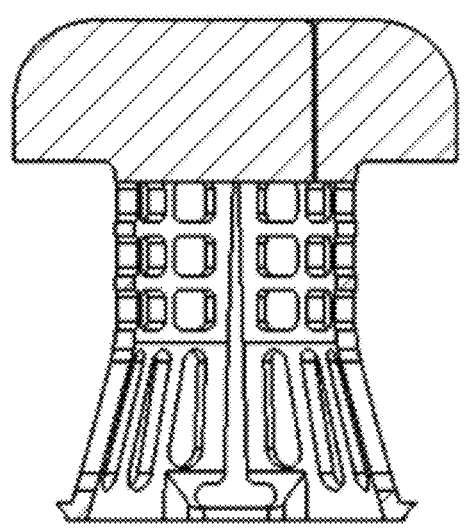
FIG. 10A is a sectional view of FIG. 10 taken along line A-A, according to an exemplary embodiment of the present invention.
Figure 11:
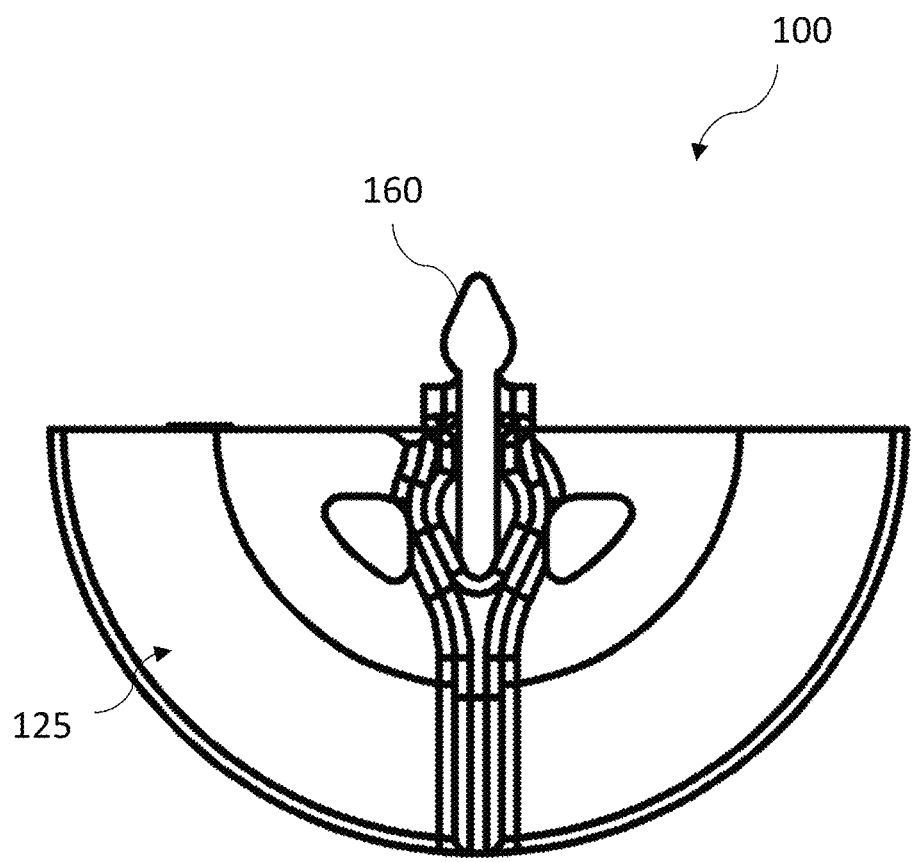
FIG. 11 is a side view of the straining device as shown in FIG. 6 further showing the male mating member of the interlocking fastener, according to an exemplary embodiment of the present invention.

The left and right tops or the left and right tabs can have an interlocking fastener for releasably coupling the left part and the right part of the body 105. Drawings show the interlocking fastener in the left tab and the right tab, however, the interlocking fastener can also be provided in the left top and the right top without departing from the scope of the present invention. The interlocking fastener 155 can have a male mating member 160 and a female mating member 165. The left tab 145 is shown to have the male mating member 160, shown in FIG. 4. The right tab 150 is shown to have the female mating member 165. The male mating member can interlock with the female mating member using a suitable fastening mechanism, such as friction fit, snap-fit, and the like. Any mechanism of the interlocking fasteners that can releasably couple the two tabs is within the scope of the present invention. FIG. 10A shows a cross-section view of FIG. 10 along lines A-A and FIG. 10 shows a cross-section view of FIG. 10 along lines B-B. In FIG. 10B, the male mating member 160 can be seen interlocked by the snap-fit mechanism. FIG. 1 1 which is a side view of FIG. 6, also shows the male mating member. The interlocking of the male mating member 160 and the female mating member 165 can also be seen in FIG. 3, which is a top view of the disclosed device 100. The disclosed device 100 can be made from silicon or any other semi-rigid material. The interlocking members i.e., 160 and 165, can be made from soft material, such as silicon can be easily engaged and disengaged by a slight force of the hands.

Figure 12:
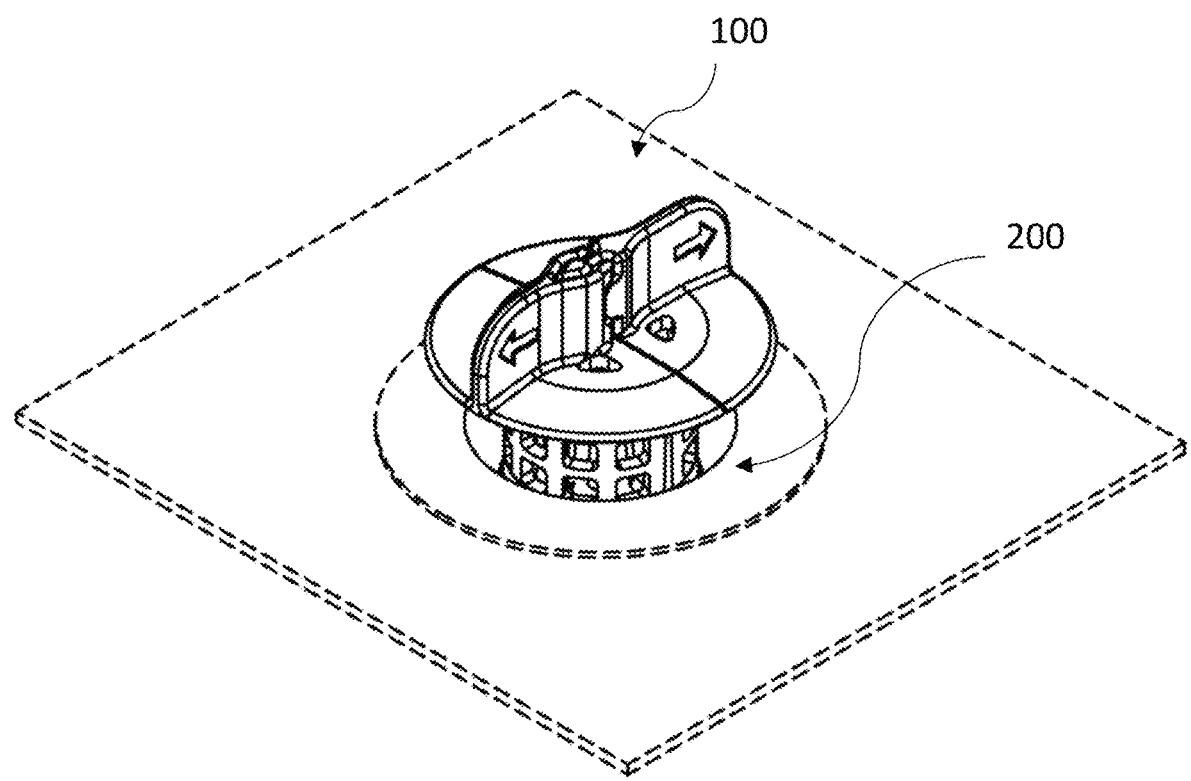
FIG. 12 shows the straining device installed in a bathtub drain, according to an exemplary embodiment of the present invention.
Figure 13A:
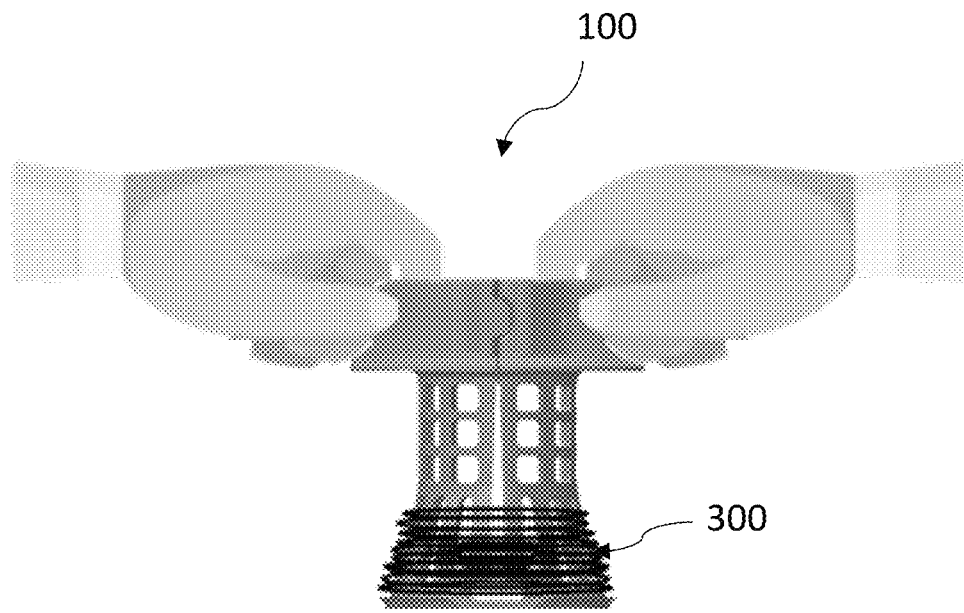
FIGS. 13A, 13B, and 13C illustrate the steps of opening the disclosed straining device to dispose of the trapped hairs, according to an exemplary embodiment of the present invention.
Figure 13B:
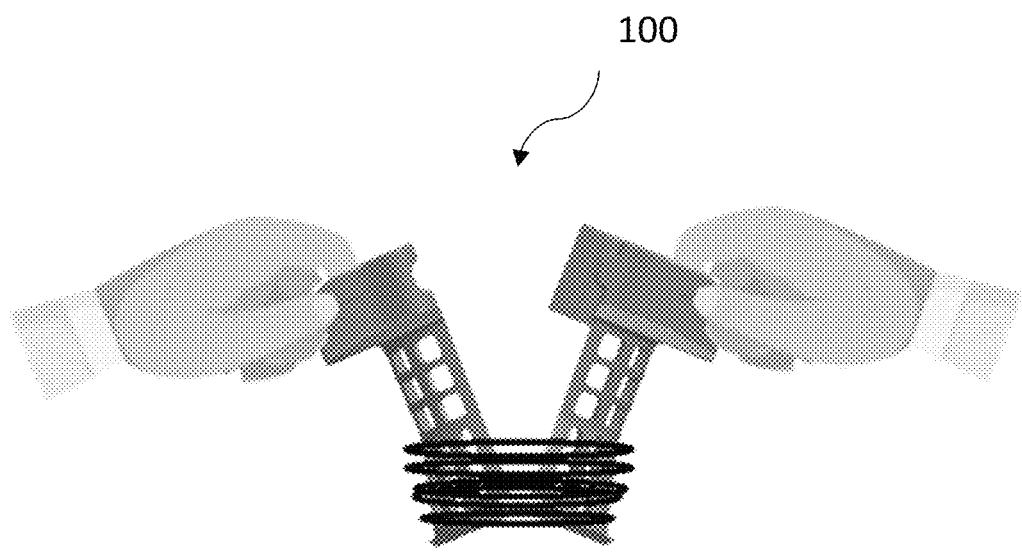
Figure 13C:
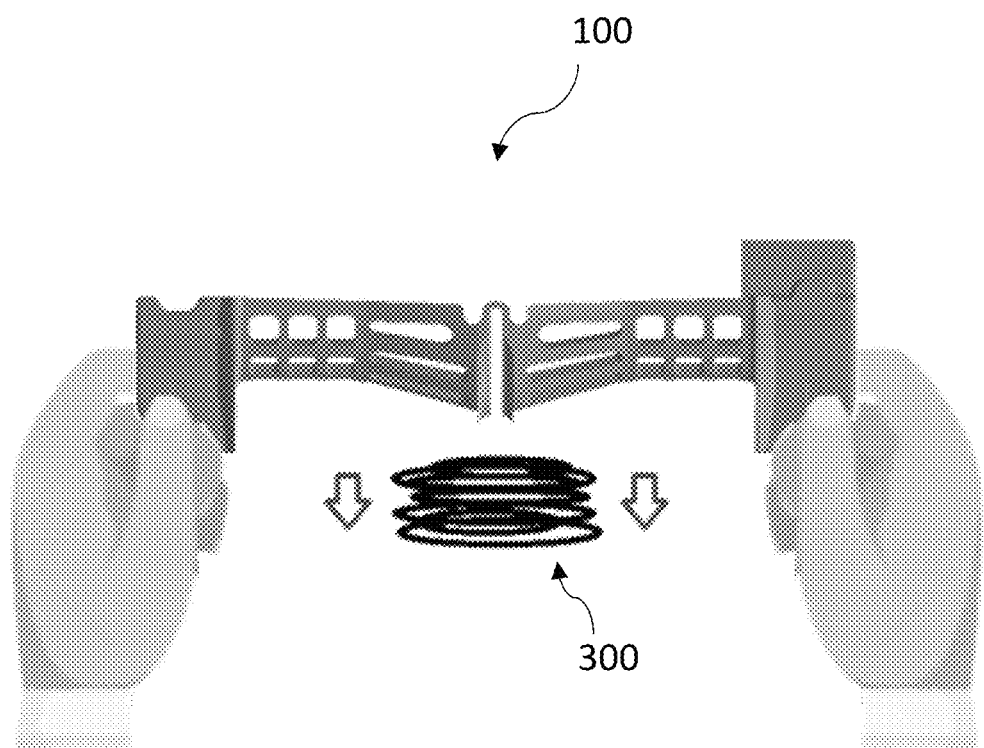

For use, the disclosed device 100 in the closed state can be dropped into a drain hole, wherein the base of the disclosed device 100 can rest upon a surrounding flange of the drain hole. FIG. 12 shows the disclosed device 100 mounted onto a drain hole 200. Water can flow into the drain through the apertures in the body of the device 100. While water and suspended impurities can pass through the apertures, the hairs suspended in the water can be retained on the outer surface of the body. Referring to FIGS. 13A, 13B, and 13C which show the steps in cleaning the disclosed device 100. First, the disclosed device 100 can be picked up from the drain hole by holding the tab between a thumb and a finger of a hand, and without getting in contact with the hairs wrapped around the disclosed device 100. The two tabs can be grasped by the fingers and thumbs of the two hands, as shown in FIG. 13A. Thereafter, the two tabs can be pulled outward by applying force by the hands, as shown in FIG. 13B. Due to force, the interlocking fastener gets unlocked, and the two parts can pivot away from each other. The two parts can be continued to be pivoted apart from each other till the wrapped hair around the disclosed device 100 drops off, as shown in FIG. 13C. All the hairs collected on the outer surface of the disclosed device 100 can be dropped off by just holding two tabs, therefore no hand contact with the hair may be needed to remove collected hairs.

In certain implementations, the left tab and the right tab can have engravings "HOLD" on one face and engraving of shape "arrows" pointing out outwards and opposite directions, as shown in FIGS. 1 and 4 can be provided. "HOLD" engraving is to instruct the user where to hold during any time he/she may want. The arrows pointing out can instruct the user in which direction to pull to clean the disclosed device 100 from the trapped hair.

The disclosed device 100 can be particularly advantageous by having several apertures, which are shaped and positioned to allow good water flow through the disclosed device 100, also when hairs get wrapped around most of the body 105 of the disclosed device 100. The straining device 100 shown in the drawings is having ten long and vertical apertures in the lower portion of the body, four small apertures in the top (FIG. 3), and thirty rectangular apertures.

Figure 14A:
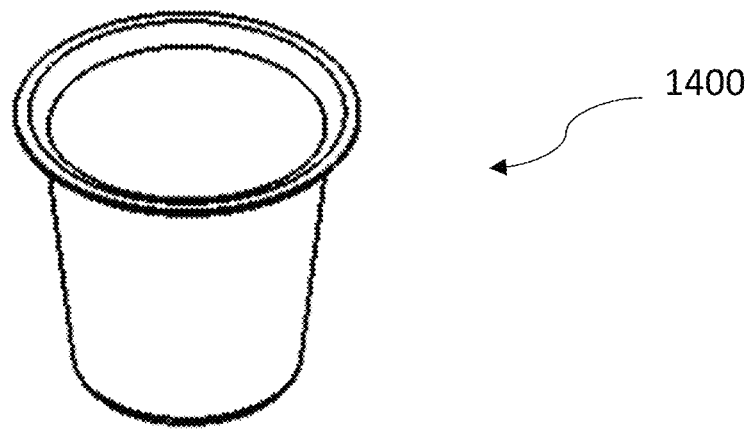
FIG. 14A is a top and side perspective view of an adaptor.
Figure 14B:
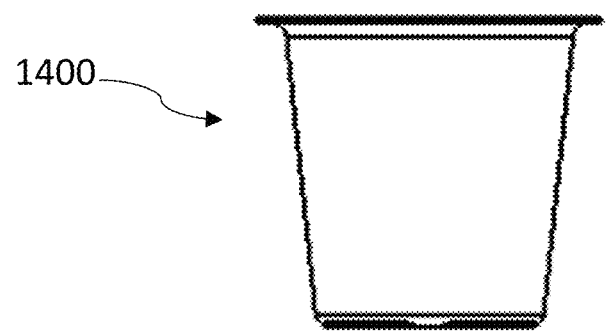
FIG. 14B is a side view of the adaptor.
Figure 14C:
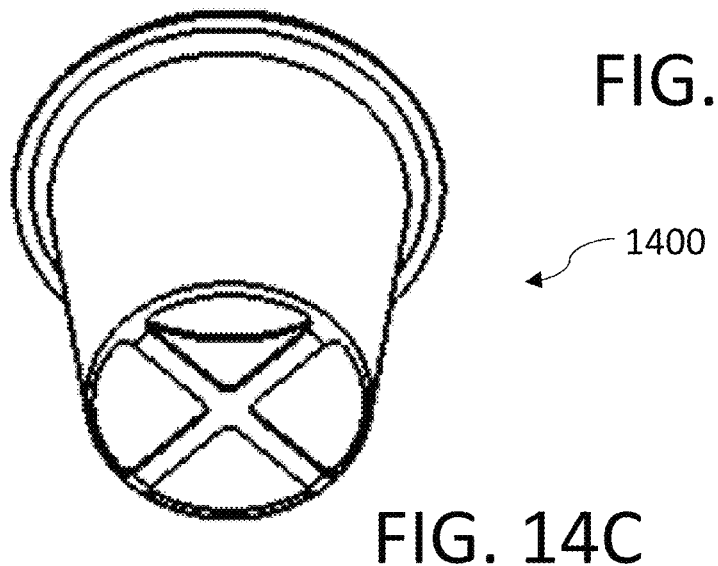
FIG. 14C is a bottom and side perspective view of the adaptor, according to an exemplary embodiment of the present invention.
Figure 14D:
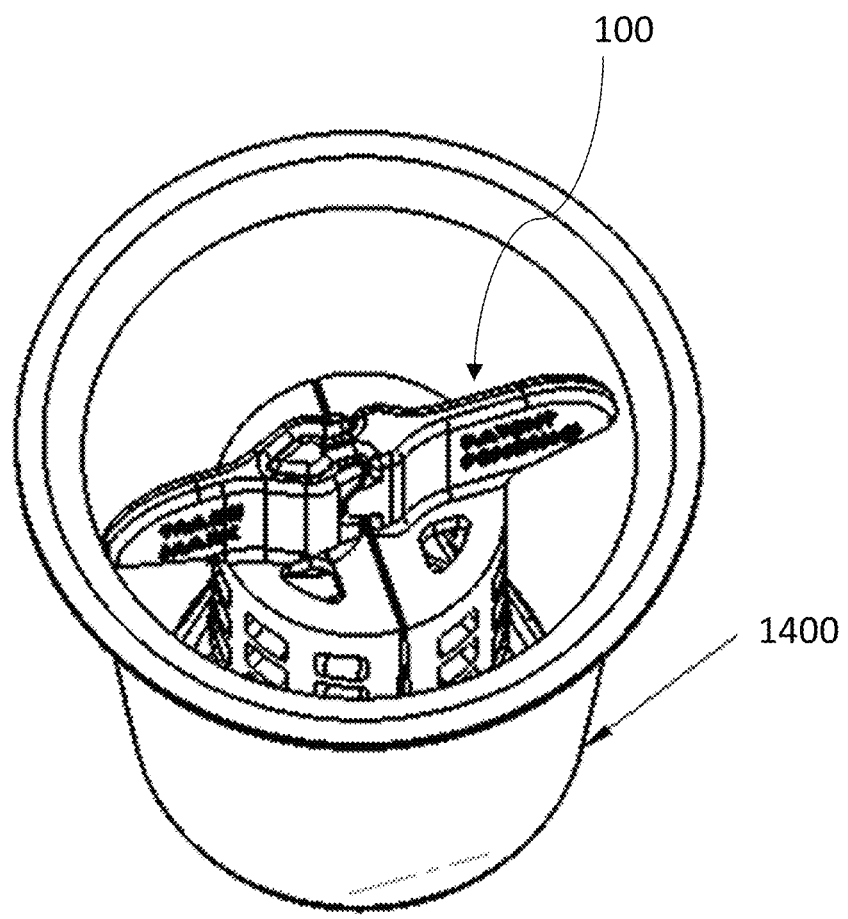
FIG. 14D shows the disclosed straining device inserted inside the adaptor, according to an exemplary embodiment of the present invention.
Figure 15:
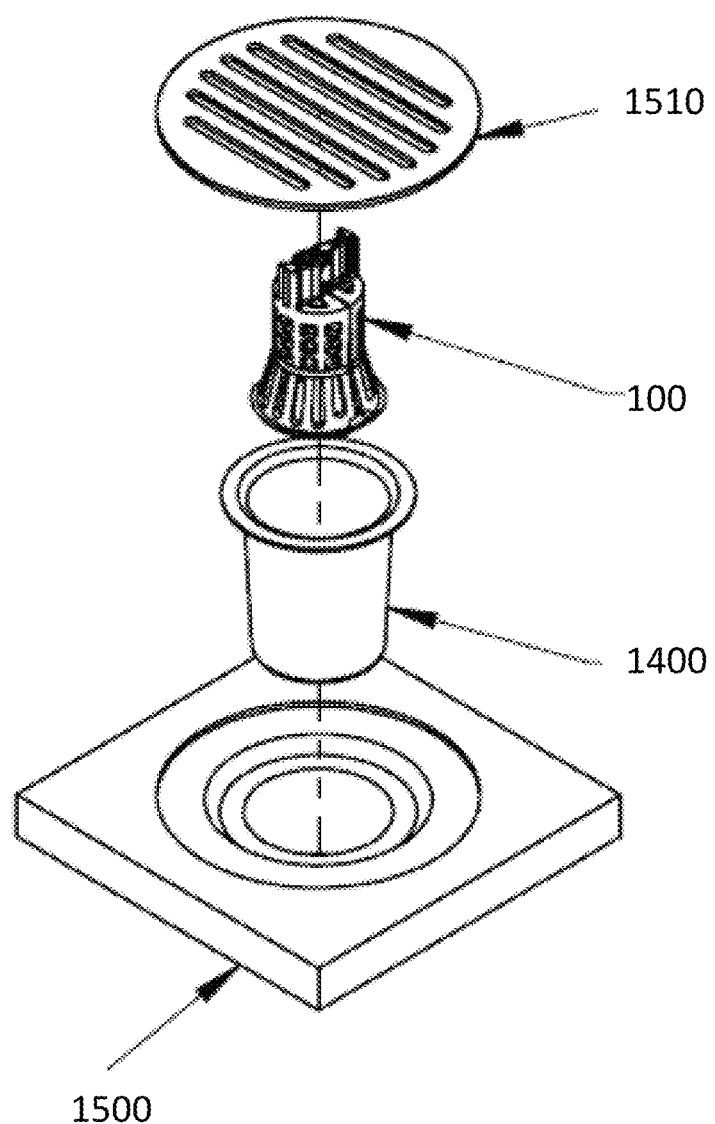
FIG. 15 is an exploded view showing installation of the straining device in a shower stall drain using the adaptor, according to an exemplary embodiment of the present invention.
Figure 16:
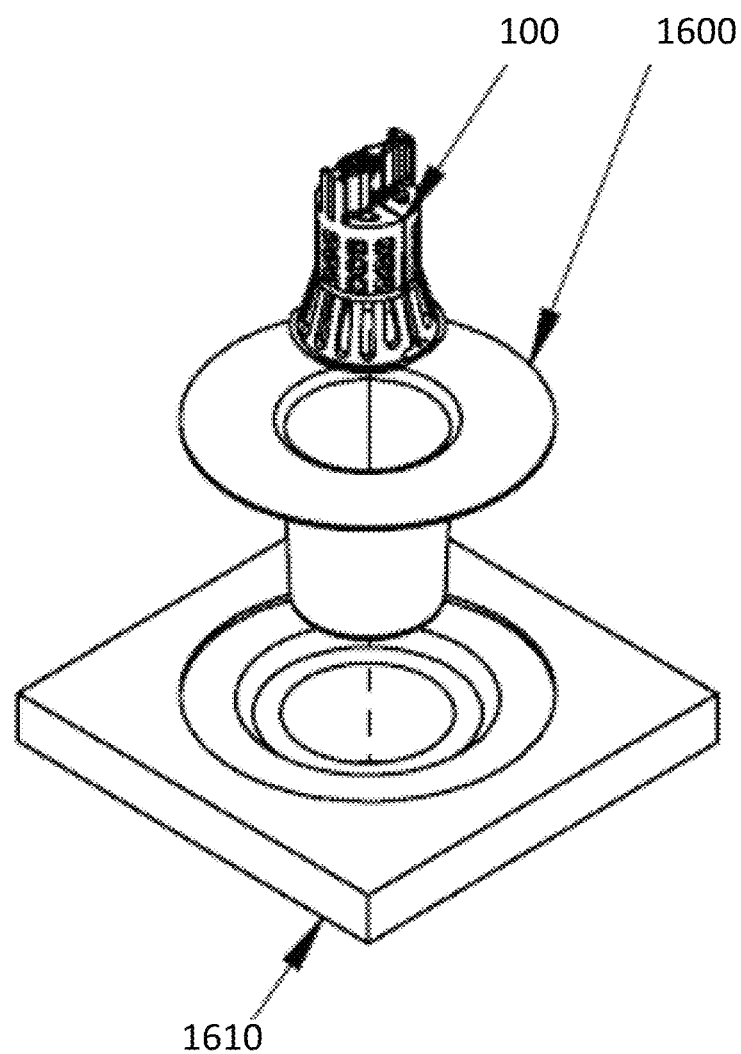
FIG. 16 is an exploded view showing installation of the straining device in a shower stall drain using another embodiment of the adaptor, according to an exemplary embodiment of the present invention.

For mounting the disclosed straining device 100 to drains of different shapes and sizes, suitable adaptors can be used. For example, the disclosed straining device 100 can be mounted to a bathtub drain, a shower stall, and a sink strainer. Referring to FIGS. 14A, 14B, and 14C which show different views of such an adaptor 1400. FIG. 14D shows the straining device 100 mounted in the adaptor 1400. FIG. 15 shows the use of adaptor 1400 to mount the disclosed straining device 100 to a shower stall drain. FIG. 15 shows the straining device 100, adaptor 1400, shower stall drain 1500, and default cover 1510 of the shower stall drain 1500. FIG. 16 shows a different type of shower stall drain 1600 for which a different adaptor 1610 has been used to mount the disclosed straining device 100.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A straining device comprising:
   a body, the body has a horizontal top and a tubular wall extending downwards from the horizontal top, the tubular wall has a plurality of apertures for water to pass through, a bottom of the body is open; and
   a flat base around a bottom periphery of the tubular wall, wherein the body comprises a left part and a right part, the left part has a left top portion and a left wall, the right part has a right top portion and a right wall, wherein the left wall and the right wall form the tubular wall, wherein the left top portion and the right top portion form the horizontal top, wherein the left part and the right part are pivotally coupled to each other at the flat base.

2. The straining device according to claim 1, wherein the left part is a mirror image of the right part.

3. The straining device according to claim 1, wherein the tubular wall has an upper portion and a lower portion, the upper portion is continuous with the lower portion, the upper portion is of a hollow cylindrical shape, the lower portion is of a conical frustum shape, wherein a diameter of a bottom of the lower portion is larger than a diameter of a top of the lower portion.

4. The straining device according to claim 3, wherein apertures in the upper portion are different from apertures in the lower portion.

5. The straining device according to claim 4, wherein the apertures in the upper portion are of a rectangular shape and the apertures in the lower portion are elongated and vertically oriented.

6. The straining device according to claim 1, wherein the flat base comprises two hinge joints for pivotally coupling the left part and the right part.

7. The straining device according to claim 1, wherein the straining device further comprises:
   a left tab that upstands from the left top portion, the left tab configured to be grabbed between two fingers or a finger and a thumb of a left hand; and
   a right tab that upstands from the right top portion, the right tab configured to be grabbed between two fingers or a finger and a thumb of a right hand.

8. The straining device according to claim 7, wherein the straining device further comprises an interlocking fastener configured to releasably couple the left top portion and the right top portion.

9. The straining device according to claim 8, wherein the interlocking fastener comprises a male mating member and a female mating member, the left tab configured with the male mating member, and the right tab is configured with the female mating member wherein the male mating member is configured to be releasably fasten to the female mating member.

10. The straining device according to claim 1, wherein the flat base is continuous along the left part and the right part, the body and the flat base are made of a semi-rigid material, wherein two bottom corners of each of the left part and the right part have arc shape cutouts.

11. A method for straining fallen hairs from water flowing into a drain, the method comprising the steps of:
   providing a straining device comprising:
      a body, the body has a horizontal top and a tubular wall extending downwards from the horizontal top, the tubular wall has a plurality of apertures for water to pass through, a bottom of the body is open, and a flat base around a bottom periphery of the tubular wall, wherein the body comprises a left part and a right part, the left part has a left top portion and a left wall, the right part has a right top portion and a right wall, wherein the left wall and the right wall form the tubular wall, wherein the left top portion and the right top portion form the horizontal top, wherein the left part and the right part are pivotally coupled to each other at the flat base.

12. The method according to claim 11, wherein the left part is a mirror image of the right part.

13. The method according to claim 11, wherein the tubular wall has an upper portion and a lower portion, the upper portion is continuous with the lower portion, the upper portion is of a hollow cylindrical shape, the lower portion is of a conical frustum shape, wherein a diameter of a bottom of the lower portion is larger than a diameter of a top of the lower portion.

14. The method according to claim 13, wherein apertures in the upper portion are different from apertures in the lower portion.

15. The method according to claim 14, wherein the apertures in the upper portion are of a rectangular shape and the apertures in the lower portion are elongated and vertically oriented.

16. The method according to claim 11, wherein the flat base comprises two hinge joints for pivotally coupling the left part and the right part.

17. The method according to claim 11, wherein the straining device further comprises:

a left tab that upstands from the left top portion, the left tab configured to be grabbed between two fingers or a finger and a thumb of a left hand; and a right tab that upstands from the right top portion, the right tab configured to be grabbed between two fingers or a finger and a thumb of a right hand.

18. The method according to claim 17, wherein the straining device further comprises an interlocking fastener configured to releasably couple the left top portion and the right top portion.

19. The method according to claim 18, wherein the interlocking fastener comprises a male mating member and a female mating member, the left tab configured with the male mating member, and the right tab is configured with the female mating member wherein the male mating member is configured to be releasably fasten to the female mating member.

20. The method according to claim 11, wherein the flat base is continuous along the left part and the right part, the body and the flat base are made of a semi-rigid material, wherein two bottom corners of each of the left part and the right part have arc shape cutout.

* * * * *